3,308,074
PROCESSES FOR THE MANUFACTURE OF CELLULAR PRODUCTS
Yvan Landler, Sceaux, and Pierre Henri Lebel, Rueil-Malmaison, Seine-et-Oise, France, assignors to Societe anonyme dite: Pneumatiques et Caoutchouc Manufacture et Plastiques Kleber Colombes, Colombes, France
No Drawing. Filed Oct. 23, 1963, Ser. No. 318,168
Claims priority, application France, Oct. 24, 1962, 913,314
28 Claims. (Cl. 260—2.5)

The present invention relates to an improvement of a process of manufacture of rigid cellular products having a polyvinyl chloride base.

One understands herein by cellular products having a polyvinyl chloride base those cellular products of which the principal constituent, by weight, is this polymer.

Such a process employed on an industrial scale for several years essentially consists of two stages.

In a first stage one molds under pressure and with the use of heat a mixture having a polyvinyl chloride base containing additionally polyisocyanate and a swelling or blowing agent; in the course of this operation, there takes place thermal decomposition of the swelling or blowing agent with liberation of an inert gas, in general, of nitrogen, which creates the embryos of the cells; the pressure due to this gaseous discharge is counterbalanced by strong pressures applied to the mold, in the course of its heating. The mold is thereupon cooled in its entire body to a temperature near the ordinary or ambient temperature; where the polyvinyl chloride is sufficiently rigid so that there exists equilibrium between the pressure prevailing on the inside of the cells and the atmospheric pressure without bursting of the cellular walls.

In a second stage, the celuular product removed from the mold is placed in contact with hot water or steam. A chemical reaction then takes place between this water, on the one hand, and the polyisocyanate and eventually other ingredients susceptible to react therewith, on the other. A hardening and a second swelling or blowing of the cellular product which attains the final dimensions thereof results therefrom.

It is also known in such a process to add to the starting mixtures polymerizable monomers which facilitate the handling and manipulation of the initial mixture by plasticizing the polyvinyl chloride, and which are not harmful to the rigidity of the cellular products obtained as a consequence of the polymerization thereof.

The products thus obtained are rigid cellular products with closed cells.

Accordingly, it is an object of the present invention to obtain rigid cellular products having a polyvinyl chloride base which possess a better coefficient of thermal conductivity than those realizable heretofore with the prior art rigid cellular products having a polyvinyl chloride base of the same density.

Still another object of the present invention resides in rigid cellular products having a polyvinyl chloride base which present improved mechanical properties compared to those realizable with the prior art rigid cellular products having a polyvinyl chloride base of the same density.

It is another object of the present invention to obtain rigid cellular products having a polyvinyl chloride base which are more light-weight than those which one could obtain heretofore with the same composition of the starting mixture.

Another object of the present invention resides in a process for the manufacture of the rigid cellular products having a polyvinyl chloride base which not only reduces the time necessary for the passage of the mold in the press but also the duration of expansion in contact with hot water or steam.

A still further object of the present invention resides in the provision of a manufacturing process for the manufacture of rigid cellular products having a polyvinyl chloride base which permits a more economic utilization of the apparatus than realizable heretofore.

Still another object of the present invention resides in a process for the manufacture of rigid cellular products having a polyvinyl chloride base which are characterized by a very fine cellular structure with the same density as attainable heretofore and with improved insulation and mechanical properties.

A further object of the present invention resides in a process for realizing relatively large cellular structures having a polyvinyl chloride base.

Still a further object of the present invention resides in cellular structures having a polyvinyl chloride base which are characterized by relatively very fine cells.

These and other objects, features and advantages will become more obvious from the following description of some specific examples included herein only for illustrative but not limitative purposes.

The present invention essentially consists in effecting in hot state the removal from the mold of molds filled with a mixture having a polyvinyl chloride base and containing additionally a polyisocyanate, a swelling or blowing agent and a polymerizable monomer, in the process described hereinabove.

By removal from the mold in hot state one understands herein a removal from the mold at temperatures comprised between 90° to 140° C., preferably between 105° and 130° C., and more particularly between 110° and 120° C., the removal from the mold must take place at a temperature superior to the softening temperatures of the polyvinyl chloride which are situated toward 60° to 80° C. and at a temperature inferior to that at which the polyvinyl chloride gels which is in the neighborhood of 160° to 180° C.

It has been noted that under these conditions there was a significant reduction not only of the time of passage of the mold under the pressure but also of the duration of expansion within the hot water or the water stream of the product removed from the mold in hot state.

The gain in time realized over the molding cycle is derived, on the one hand, from the fact that the molds are loaded in the press when the latter is still hot and particularly from the fact that there is no longer any need to cool the press to a temperature near the ordinary or ambient temperature since the removal from the mold takes place in a hot state. Hence, there is improved utilization of the presses which remain always heated.

In the case, for example, of a mold with a thickness of 30 mm., the molding cycle which was of the order of 60 minutes when the press was cooled to a temperature near the ordinary temperature, only amounts to 30 to 40 minutes with removal from the mold in hot state or heated condition.

The gain in time realized on the expansion cycle in hot water or steam is also quite considerable and subsists even if the embryonic cellular product, after removal from the mold in hot state is cooled to the ordinary or ambient temperature before being placed into contact with the hot water or the steam.

The periods of expansion in the hot water which were of the order of four to eight hours, only amount to one-and-a-half to three hours depending on density of the cellular products.

On the other hand, the prior art technique hardly permitted to obtain expanded cellular products having a thickness exceeding 100 mm. In effect, since the water acted from the outside toward the inside, one obtained indeed a second swelling or blowing but also a hardening takes place which commences on the surface of the sample and this hardened crust or skin impeded the second swelling of the inner or middle part of the sample when the water succeeded to penetrate the same. However, it has been noted that putting the present invention to practice permitted to obtain, after expansion in hot water, blocks which may attain thicknesses of 120, 130 and even 150 mm.

Another unexplained fact is the structure of the cellular bodies, made according to the present invention. These bodies have a multitude of extremely fine cells, hardly visible to the naked eye, whereas the products obtained after removal of the mold at temperatures near the ordinary or ambient temperature have a structure with a base of large cells. The volume filled by cells supposed spheric and having a diameter inferior to 200 microns, which was hitherto about 10% of the total volume, reaches now 100% of the total volume of the foam prepared according to the invention. The realization of a body with fine cells has enormous advantages over a body with large cells of the same density: the insulation properties (coefficient of thermal conductivity), the mechanical properties (resistance to compression) and the thermal behavior are in effect closely dependent on the cellular structure and are the better the more the cellular structure is constituted by smaller cells.

For mixtures having a polyvinyl chloride base and comprising additionally a polyisocyanate, a blowing or swelling agent and a polymerizable monomer, removals from the mold at temperatures below 90° C. are not interesting, for they do not permit obtaining the improvements of the present invention. On the other hand, removals from the mold effectuated at temperatures above 140° C. produce an explosion of the cells as the product removed from the mold is too soft to resist to the internal pressures of the gas contained within the cells of these mixtures. By rigid cellular products, one understands cellular products manufactured from mixtures containing no substantial amount of the usual plasticizing agents of polyvinylchloride well known from one skilled in the art such as phthalates, phosphates-sebacates, etc. which are non-volatile plasticizers, i.e. boiling at normal pressure over 100° C. therefore non-removable by evaporation during the manufacture.

By mixtures having a base of polyvinyl chloride, one understands in the description and claims herein mixtures of which the principal constituent, by weight, is this polymer.

By polyvinyl chloride one understands herein the homopolymer as well as the copolymers of the polyvinyl chloride containing less than 25% of vinylidene monomers such as vinylidene chloride, or vinyl monomers such as vinyl acetate. The starting mixtures contained between 20 and 80%, preferably between 40 and 60% by weight of polyvinyl chloride.

The mixtures having a base of polyvinyl chloride to which the present invention applies must contain additionally a polyisocyanate, a swelling or blowing agent and one or several polymerizable monomers.

The polyoisocyanates are organic polyisocyanates such as 1,4-tetramethylene or cyclobutane diisocyanate, 1,6-hexamethylene or cyclohexane diisocyanate, 1,10-decamethylene diisocyanate, 1,4-cyclohexylene diisocyanate, 1,1-dimethyl-1, 2-ethylene diisocyanate, triphenyl methane-4-4',4" triisocyanate, benzene - 1,3,5 - triisocyanate, monochlorobenzene-2,4,6-triisocyanate and diphenyl 1-2, 4,4' triisocyanate. The polyisocyanates preferred within the scope of the present invention are the aromatic diisocyanates such as 2,4-toluene diisocyanate, 2,6-toluene diisocyanate, 2,5 - m - xylene diisocyanate, 4-chloro-1,3 phenylene diisocyanate, 3,3'-dichloro-4,4' biphenylene diisocyanate, meta-phenylene diisocyanate, para-phenylene diisocyanate, 1,5-naphthalene diisocyanate, diphenylmethane - p' diisocyanate, 4,4'-biphenylene diisocyanate, triphenylmethane-p,p' diisocyanate.

The starting mixtures contain between 10 to 40%, preferably 20 to 30% by weight of polyisocyanates.

By blowing or swelling agent one understands in the description and claims herein chemical compounds susceptible to decompose under the action of heat with liberation of an inert gas, in general, nitrogen, and they are the azo or azoic compounds, azodicarbonamide, azobisisobutyronitrile, diazoaminobenzene, N - nitroso compounds such as N,N' dimethyl-N,N' dinitrosoterephthalamide or N,N' dinitrosopentamethylene-tetramine or still the compounds of the sulfonylhydrazide types such as benzene-sulfonylhydrazide diphenylsulfone-3,3' disulfonylhydrazide or the 4,4' oxybis (benzenesulfonylhydrazide). These starting mixtures contain 0.1 and 5%, preferably between 0.5 and 2.5% by weight of such swelling or blowing agents.

The starting mixtures, to obtain the improvements of the present invention, must also contain one or several polymerizable monomers. By polymerizable monomers one understands in the present description and claims herein an organic compound containing a double ethylene bond. Among these organic compounds containing this double bond are the polymerizable monomers of the vinyl or vinylidene type such as the styrene, the acrylonitrile, the acrylate of methyl, the acrylate of ethyl, the acrylate of octyl, the methylacrylate of methyl, the methylacrylate of ethyl, and other esters of the acrylic and alkyl acrylic acids also figure among these compounds such as the maleic anhydride, the fluorinated derivatives and in a general manner the halogenated derivatives of these compounds and of other organic compounds containing a double bond. The starting mixtures contain between 2 and 30%, preferably between 5 and 20% by weight of the polymerizable monomers.

The mixtures which one introduces into the mold are never products having already been partially blown or swelled as is the case for other thermo-plastic materials and they are introduced into perfectly tight molds to attain cellular products with closed cells.

Pigments, stabilizing and similar charges of conventional nature may be incorporated into the starting mixtures if necessary without departing from the scope of the present invention, provided that they do not impart a softening or plasticizing action to the polyvinylchloride in the final rigid cellular product.

The heating takes place at a temperature at which takes place the gellification of the polyvinyl chloride, generally at a temperature of the order of 160 to 200° C.

The present invention thus permits to obtain cellular materials having improved mechanical characteristics compared to those realizable heretofore with the same density, a better insulating power with the same density and a more rapid manufacturing rate.

Though the present invention is in no way tied to any scientific explanation, it is assumed that the polymerization of a monomer within the mold permits to arrive at a less fluid product than heretofore after the passage under the press, which in turn permits to avoid the bursting of the cells when one removes the product from the mold in heated state.

The following non-limitative examples are included herein only for illustrative purposes of the present invention. All of the proportions are by weight except where indicated to the contrary.

*Example I*

One effects a mixture of 61.5 parts of polyvinyl chloride, 28 parts of a mixture of 2,4 and 2,6 diisocyanate of toluene, 1.5 parts of azobisisobutyronitrile and 9 parts of methacrylate of methyl.

One fills a tight mold of 150 x 150 x 20 mm. with this mixture and one introduces the same into a press which one heats during fifteen minutes to 200° C. under a pressure of 250 kg./cm.$^2$. One thereupon cools the press and leaves the same during 20 minutes at 110° C. before removal of the product from the mold at this temperature. The duration of the molding cycle is about 45 minutes.

After letting the product removed from the mold stand during two hours, one immerses the same into boiling water at atmospheric pressures during four hours.

The properties of the cellular products obtained are indicated in Table 1.

For purposes of comparison, one has removed from the mold in cold state (20° C.) a product of the same composition introduced into an identical mold, heated during 15 minutes to 200° C. under 250 kg./cm.$^2$ and maintained 20 minutes at ambient temperature (20° C.). The duration of this molding cycle is about 60 minutes; for the press attains only slowly the ambient temperature.

This product has been expanded subsequently in boiling water under ordinary pressure during eight hours and its properties are indicated in Table 1.

TABLE 1

| | | |
|---|---|---|
| Temperature of removal from mold in ° C | 110 | 20 |
| Density in g./cm.$^3$ | 0.090 | 0.140 |
| Resistance to the compression in kg./cm.$^2$ at ambient temperature | 14 | 18 |
| Compression modulus in kg./cm.$^2$ at ambient temperature | 420 | 650 |
| Coefficient of thermal conductivity kcal./m./hour/° C. at a mean temperature of 35° C | 0.030 | 0.038 |

It may be concluded that thanks to the removal from the mold in hot state the product obtained is more lightweight, whence the possibility of obtaining more cellular product, as compared to the process of removing from the mold in cold state, for the same quantity of the same mixture introduced into the mold.

In Table 2 is indicated the composition of a mixture comprising the same ingredients and the properties of the cellular product obtained with this mixture after removal from the mold in cold state and having the same density 0.090 as the cellular product mentioned hereinabove and removed from the mold in hot state.

TABLE 2

| | |
|---|---|
| Polyvinyl chloride | 54.5 |
| Mixture of 2-4 and 2-6 diisocyanate of toluene | 33 |
| Azobisisobutyronitrile | 3.5 |
| Methacrylate of methyl | 9 |
| Temperature of removal from mold in ° C. | 20 |
| Density in g./cm.$^3$ | 0.090 |
| Resistance to the compression in kg./cm.$^2$ at ordinary temperature | 12.5 |
| Compression modulus in kg./cm.$^2$ at ordinary temperature | 400 |
| Coefficient of thermal conductivity in kcal./m./hour/° C. at a mean temperature of 35° C. | 0.036 |

A comparison of the figures indicated in Tables 1 and 2 permits to note that the removal from the mold in hot state improves not only the mechanical properties of the cellular products of a given density but also the coefficient of thermal conductivity thereof, within remarkable proportions.

This is explained by the fact that the cellular products removed from the mold in hot state have a structure of innumerable very small cells whereas the cellular product of same density removed from the mold in cold state has a structure of large cells.

It has been noted that particularly remarkable results were obtained according to the present invention with starting mixtures having a polyvinyl chloride base and containing additionally a polyisocyanate, a swelling or blowing agent and one or several monomers, if these mixtures comprise also an anhydride of ethylene carboxylic acids or acrylic acids, such as the maleic anhydride, the acrylic anhydride, the itaconic anhydride and the citraconic anhydride. The starting mixtures may contain between 2 and 30%, preferably between 5 and 20% by weight of such anhydrides.

The mixtures permit to obtain rigid cellular products having a polyvinyl chloride base which are reticulate and it becomes then possible to introduce eventually halogenated alkanes with a boiling point situated between −50 and +100° C. at atmospheric pressure such as trichloromonofluoromethane, dichlorodifluoromethane, monochlorodifluoromethane or trichlorotrifluoroethane. The starting mixtures may contain between 5 and 30%, preferably 6 and 15% by weight of halogenated alkanes.

These halogenated alkanes fill the fine cells obtained by the process according to the present invention, and it becomes possible to obtain rigid cellular products having a polyvinyl chloride base with a remarkably low coefficient of thermal conductivity.

*Example II*

One mixes 46.5 parts of polyvinyl chloride, 25 parts of a mixture of 2-4 and 2-6 diisocyanate of toluene, 1.5 parts of azobisisobutyronitrile, 4 parts of trichloromonofluoromethane, 21 parts of maleic anhydride and 2 parts of styrene.

One fills a mold 450 x 590 x 30 mm. with this mixture and introduces the same between the plates of the press which is heated for twenty minutes at 160° C. under a pressure of 150 kg./cm.$^2$. Thereupon one cools and leaves the same during twenty minutes at a certain temperature before removal from the mold at this temperature.

After letting it stand for two hours, one immerses the product removed from the mold in boiling water at ordinary pressure during three hours.

The properties of the cellular products obtained by removal from the mold at different temperatures are indicated in Table 3 as a function of the temperature of removal from the mold and they are compared with those of a cellular product of same composition but removed from the mold in cold state.

TABLE 3

| | | | | |
|---|---|---|---|---|
| Temperature of removal from the mold in ° C | 130 | 110 | 90 | 20 |
| Density in kg./m.$^3$ | 30 | 35 | 40 | 45 |
| Resistance to compression in kg./cm.$^2$ at ambient temperature | 3 | 4.5 | 5.5 | 4.9 |
| Compression modulus in kg./cm.$^2$ at ambient temperature | 150 | 260 | 290 | 220 |
| Coefficient of thermal conductivity in kcal/.m./hour/° C. at a mean temperature of 35° C | 0.021 | 0.021 | 0.022 | 0.029 |

In Table 4 are indicated the compositions of mixture comprising the same ingredients and having all been removed from the mold in cold state but for which the densities correspond to those of the products of Table 3 removed from the mold in hot state.

TABLE 4

| | | | |
|---|---|---|---|
| Polyvinyl chloride | 34.5 | 35.8 | 42.5 |
| Mixture of 2, 4 and 2, 6 diisocyanate of toluene | 28 | 25 | 20 |
| Azobisisobutyronitrile | 2.5 | 2.2 | 1.5 |
| Trichloromonofluoromethane | 10 | 10 | 8 |
| Maleic anhydride | 20 | 19 | 19 |
| Styrene | 5 | 8 | 9 |
| Temperature of removal from mold in ° C | 20 | 20 | 20 |
| Density in kg./m.$^3$ | 30 | 35 | 40 |
| Resistance to the compression in kg./cm.$^2$ at ambient temperature | 2.5 | 2.9 | 3.4 |
| Compression modulus in kg./cm.$^2$ at ambient temperature | 105 | 130 | |
| Coefficient of thermal conductivity in kcal./m./hour/° C. at a mean temperature of 35° C. | 0.026 | 0.028 | 0.028 |

It is noted that with such mixtures one attains more lightweight products of which the mechanical as well as the insulating characteristics are clearly improved as compared to a removal from the mold in cold state. It thus becomes possible to obtain rigid cellular products having a polyvinyl chloride base with a coefficient of thermal conductivity which has not been attainable heretofore.

*Example III*

The following example proves that the presence of a polyisocyanate in the starting mixture is compulsory in order to achieve the results of the invention.

A mixture consisting in 55 parts of polyvinylchloride, 15 parts of azodicarbonamids and 30 of styrene are treated as described in Example I.

TABLE 5

| | | |
|---|---|---|
| Temperature of removal from mold in ° C. | 110 | 20 |
| Coefficient of thermal conductivity in kcal./m./hour/° C. at a mean temperature of 35° C. | 0.038 | 0.038 |

The resulting cellular products have not a fine cellular structure, and their coefficient of thermal conductivity is not at all improved by a removal from the mold in hot state as indicated in Table 5. This poor isolation properties are a consequence of the lack of polyisocyanate in the starting mixture.

*Example IV*

The following examples prove that the presence of plasticizing agents in the starting mixtures prevents to obtaining the improvements of the invention.

Two molds are respectively filled with a mixture A and a mixture B, the composition of which is indicated in Table 6 and they are treated as described in Example 2.

TABLE 6

| | Mixture A | Mixture B |
|---|---|---|
| Polyvinylchloride | 46.5 | 46.5 |
| Toluene diisocyante | 25 | |
| Azobisisobutyronitrile | 1.5 | 1.5 |
| Trichloromonofluoro methane | 4 | |
| Tricresylphosphate | 23 | |
| Dioctyl phthalate | | 23 |

The resulting cellular products have a very irregular cellular structure, especially those having been removed from the mold in hot state and they all have poor isolation properties, as illustrated by their coefficient of thermal conductivity shown in Table 7.

TABLE 7

| | Mixture A | | Mixture B | |
|---|---|---|---|---|
| Temperature of removal from mold in ° C. | 20 | 110 | 20 | 110 |
| Coefficient of thermal conductivity in kcal./m./hour/° C. at a mean temperature of 35° C. | 0.038 | 0.040 | 0.042 | 0.045 |

While we have described several examples in accordance with the present invention, it is understood that the same is not limited thereto but is susceptible of numerous changes and modifications within the spirit and scope thereof, and we therefore do not wish to be limited to the details described herein but intend to cover all such changes and modifications as are encompassed by the scope of the appended claims.

We claim:

1. An improved process for the manufacture of rigid cellular products having a polyvinyl chloride base, comprising the steps of heating, in a first stage, within an airtight mold under pressure a starting mixture having a polyvinyl chloride base and additionally containing a polyisocyanate, a blowing agent and an ethylenically unsaturated polymerizable monomer,
   removing the cellular product from said mold in a hot state at a temperature of about 90 to 140° C.,
   and reacting, in a second stage, the cellular product removed from the mold with hot water or stream.

2. Process according to claim 1, wherein the removal from the mold is effectuated at a temperature of between 105 and 130° C.

3. Process according to claim 1, wherein the starting mixture also contains an anhydride of ethylene carboxylic acid.

4. Process according to claim 3, wherein the starting mixture also contain a halogenated alkane.

5. A cellular product made in accordance with the process of claim 1.

6. A celluar product made in accordance with the process of claim 2.

7. A cellular product made in accordance with the process of claim 3.

8. A cellular product made in accordance with the process of claim 4.

9. An improved process for the manufacture of rigid cellular products having a polyvinyl chloride base, comprising the steps of effecting a starting mixture having 20–80% by weight of polyvinyl chloride, 10–40% by weight of a polyisocyanate, 0.1–5% by weight of a blowing agent, and 2–30% by weight of an ethylenically unsaturated polymerizable monomer,
   heating said starting mixture within a tight mold under pressure to a temperature at which gellification of the polyvinyl chloride takes place to thereby produce an embryonic cellular product,
   removing said embryonic cellular product from said mold in a hot state at a temperature of about 90 to 140° C.,
   and reacting said embryonic cellular product with hot water or steam.

10. An improved process for the manufacture of rigid cellular products having a polyvinyl chloride base, comprising the steps of effecting a starting mixture having 20–80% by weight of polyvinyl chloride, 10–40% by weight of a polyisocyanate, 0.1–5% by weight of a blowing agent, and 2–30% by weight of an ethylenically unsaturated polymerizable monomer,
   heating said starting mixture within a tight mold under pressure to a temperature at which gellification of the polyvinyl chloride takes place to thereby produce an embryonic cellular product,
   removing said embryonic cellular product from said mold in a hot state at a temperature of about 105–130° C.,
   and reacting said embryonic cellular product with hot water or steam.

11. A process according to claim 10, wherein the starting mixture has 40–60% by weight of polyvinyl chloride, 20–30% by weight of a polyisocyanate, 0.5–2.5% by weight of a blowing agent, and 5–20% by weight of an ethylenically unsaturated polymerizable monomer.

12. A process according to claim 11, wherein the blowing agent is an azoic compound.

13. A process according to claim 10, wherein the blowing agent is an azoic compound.

14. A process according to claim 10, wherein the starting mixture contains 2–30% by weight of an anhydride of ethylene carboxylic acid.

15. A process according to claim 14, wherein the starting mixture contains 5–30% by weight of a halogenated alkane.

16. A process according to claim 11, wherein the starting mixture contains 5–20% by weight of an anhydride of ethylene carboxylic acid.

17. A process according to claim 16, wherein the starting mixture contains 6–15% by a halogenated alkane having a boiling point of between −50° and +100° C.

18. A product made in accordance with the process of claim 10.

19. A product made in accordance with the process of claim 11.

20. A product made in accordance with the process of claim 12.

21. A product made in accordance with the process of claim 13.

22. A product made in accordance with the process of claim 14.

23. A product made in accordance with the process of claim 15.

24. A product made in accordance with the process of claim 16.

25. A product made in accordance with the process of claim 17.

26. In a multi-stage process for manufacturing rigid cellular products having a polyvinyl chloride base which includes, within a first stage, the step of heating within a tight mold under pressure a mixture having a polyvinyl chloride base and containing additionally a polyisocyanate, a swelling agent and an ethylenically unsaturated polymerizable monomer, and, within a second stage, the steps of reacting the product removed from the mold with hot water or steam, in heated condition, the improvement which comprises effecting the removal of the cellular product from the mold between the first and second stages at a temperature of about 90° and 140° C.

27. In a multi-stage process for manufacturing rigid cellular products having a polyvinyl chloride base which consists essentially of, within a first stage, of heating within a tight mold under pressure a mixture having a polyvinyl chloride base and containing additionally polyisocyanate, a swelling agent and an ethylenically unsaturated polymerizable monomer, and within a second stage to react the product removed from the mold after cooling of the mold with hot water or steam, the improvement which comprises effecting the removal from the mold at a temperature of about 105 and 130° C.

28. In a process according to claim 27, wherein the starting material also contains an anhydride of ethylene carboxylic acid and a halogenated alkane.

References Cited by the Examiner
UNITED STATES PATENTS

| | | | |
|---|---|---|---|
| 3,160,689 | 12/1964 | Brunner | 260—2.5 |
| 3,200,089 | 9/1965 | Landler et al. | 260—2.5 |

MURRAY TILLMAN, *Primary Examiner.*

N. F. OBLION, MORTON FOELAK,
*Assistant Examiners.*